June 1, 1965 W. LIBEN 3,186,229
TEMPERATURE-SENSITIVE DEVICE
Filed Sept. 26, 1961

INVENTOR.
WILLIAM LIBEN
BY Herman L. Gordon
ATTORNEY

3,186,229
TEMPERATURE-SENSITIVE DEVICE
William Liben, 11404 Monticello Ave., Silver Spring, Md.
Filed Sept. 26, 1961, Ser. No. 141,276
4 Claims. (Cl. 73—362)

This invention relates to temperature-responsive devices, and more particularly to a temperature-sensing element for use in electrical instruments of various types where high sensitivity to changes in physical conditions is required.

A main object of the invention is to provide a novel and improved electrical temperature sensing element for use in gauges and similar equipment, said sensing element being simple in construction, being compact in size, and being highly sensitive.

A further object of the invention is to provide an improved temperature sensing element of the resistance type, said element being relatively inexpensive to manufacture, providing accurately reproducible response characteristics, and being manufacturable in a wide variety of sizes and shapes so that it may be easily incorporated in various types of test equipment.

A still further object of the invention is to provide an improved vacuum gauge of the type employing a temperature-responsive electrical sensing element, said sensing element having a high overall sensitivity, and the gauge being so arranged that it is unnecessary to employ a dummy or reference member therewith.

Further objects and advantages of the invention will become apparent from the following description and claims, and from the accompanying drawings, wherein:

Figure 1:
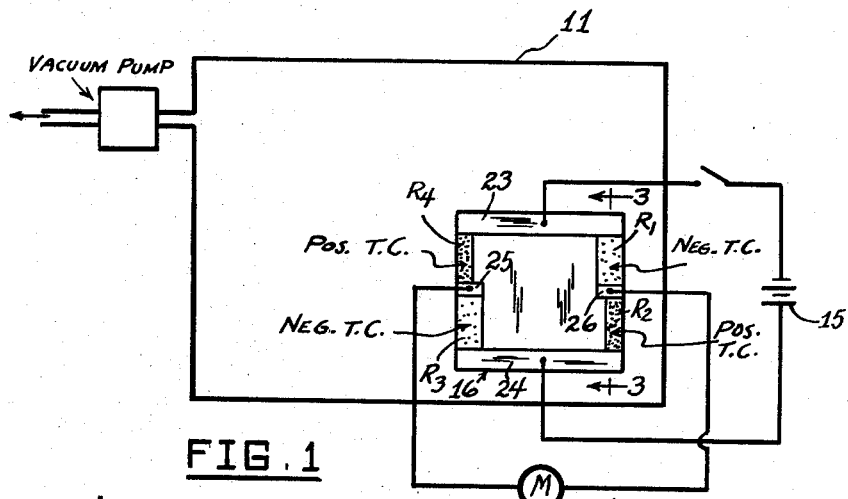
FIGURE 1 is a diagrammatic view of a vacuum gauge employing an improved electrical temperature sensing element constructed in accordance with the present invention.

FIGURE 1 diagrammatically represents a typical example of an arrangement which employs a temperature-sensing element according to the present invention as a means to measure the pressure of the residual gases in an evacuated chamber 11.

The arrangement of FIGURE 1 is based on the following physical phenomenon: If a resistor is supplied with either a constant voltage or a constant current its temperature is then a function of the heat loss from the resistor. One of the causes of heat loss is convection. Since convection heat loss depends upon the residual pressure, it is found that the heat loss, and consequently the resistor temperature, depends upon the gas pressure. If the resistor is made of a material whose resistance is a function of the temperature, it is found that the pressure is related to the resistance, thus providing a means of measuring vacuum in terms of resistance. The well known Pirani gauge is an example of the application of this general principle.

In the present invention a sensing element is employed which in part increases its resistance as the temperature increases, and in part decreases its resistance as the temperature increases. This is advantageous as compared with customary gauges of this type, since a dummy sealed gauge is not required, as in the devices of the prior art, and furthermore, the overall sensitivity is about four times as great as the prior art devices.

Figures 2, 5:
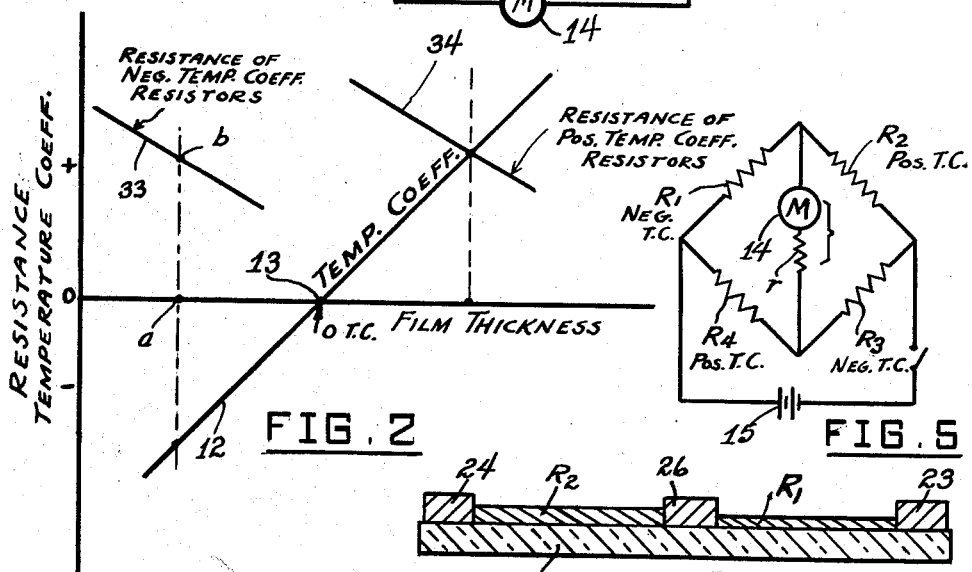
FIGURE 2 is a graph showing the variation of temperature coefficient with film thickness in deposited resistance films of material employed in temperature sensing elements according to the present invention, and also showing the variation of resistance with film thickness, which may be utilized as a measure of film thickness in forming resistance elements of desired temperature coefficients.
FIGURE 5 is a schematic circuit diagram of a typical bridge arrangement according to the present invention.

It is known that the temperature coefficient of resistance of a metal film depends upon the film thickness. If the film is very thin the coefficient is negative. As the film thickness is increased the temperature coefficient of resistance decreases, passes through zero, and then becomes positive. This is illustrated in FIGURE 2, wherein 12 designates a typical temperature coefficient characteristic curve for a metal film showing variation of the temperature coefficient with film thickness. It will be noted that the temperature coefficient characteristic is negative at the left side of the zero temperature coefficient film thickness value 13, and is positive at the right side of the film thickness value 13.

According to the present invention, a vacuum gauge sensing element is employed comprising two films of thickness so adjusted as to have equal positive temperature coefficients of resistance and two films so adjusted as to have equal negative temperature coefficients of resistance. These four resistors are connected in a conventional bridge circuit configuration with the two positive temperature coefficient resistors as two diagonally opposite arms and the two negative temperature coefficient resistors as the other two diagonally opposite arms. The bridge is supplied from a source of constant current or voltage. The output signal will be about four times as large as if a single resistor of positive or negative temperature coefficient of resistance were employed in the bridge.

A simplified analysis of a typical bridge arrangement, as shown schematically in FIGURE 5, is as follows:

In FIGURE 5, the resistors $R_2$ and $R_4$ have positive temperature coefficients and the resistors $R_1$ and $R_3$ have negative temperature coefficients. The resistance of the meter 14 is designated as $r$, and the voltage of the battery 15 is designated as $V$. The resistance of $r$ is assumed to be independent of temperature. It is further assumed that the nominal values of the circuit resistors are all equal to a common value $R$, namely, $$R_1 = R_2 = R_3 = R_4 = r = R$$

The current $i$ through the meter 14 will be given by:

$$i = \frac{V(R_2 R_4 - R_1 R_3)}{r(R_1+R_2)(R_4+R_3)+R_1 R_2(R_3+R_4)+R_3 R_4(R_1+R_2)}$$

Assume that under a given power dissipation in the resistors and given ambient test conditions, such as pressure in a vacuum chamber, or rate of air flow over the sensing element, each of the temperature-responsive resistors changes in value by an amount $s$. Then $$R_1 = R-s,\ R_2 = R+s,\ R_3 = R-s \text{ and } R_4 = R+s$$

Then $$i = \frac{V(R^2 + 2Rs + s^2 - R^2 + 2Rs - s^2)}{r(2R)(2R) + (R^2 - s^2)2R + (R^2 - s^2)2R}$$

or $$i = \frac{4Vs}{4Rr + 4R^2 - 4s^2}$$

In all practical cases $4s^2$ will be negligible compared to $4Rr + 4R^2$, so $$i = \frac{Vs}{2R^2}$$

It can be shown that this is about four times the amount of signal current obtained when only one temperature-sensitive resistor is used.

The sensing element may be made by a variety of methods available to make thin film resistors. A typical method of making a sensing element, such as that shown at 16 in FIGURE 1, would be to evaporate metal in a high vacuum from a metal vapor source onto a glass or mica support 17. The resulting metal film shapes may be controlled by masks with openings shaped so that the resistors produced will be of convenient size and value, and the thicknesses are so selected as to produce the four resistors required on one side of the support. After the desired resistors are deposited, the element is removed from the evaporator, suitable wires are soldered to the bridge terminals, and the support is mounted in a chamber or tube in communication with the vacuum chamber wherein it is desired to measure the pressure, or, as shown in FIGURE 1, may be mounted directly in the vacuum chamber.

Figure 3:
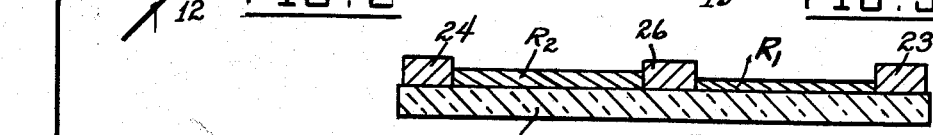
FIGURE 3 is a greatly enlarged cross-sectional view taken substantially on the line 3—3 of FIGURE 1.
Figure 4:
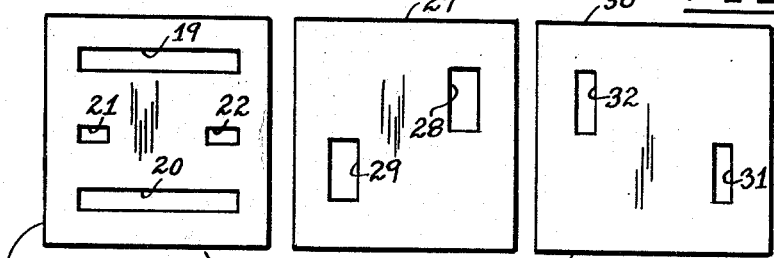
FIGURE 4 is a plan view of a set of masks which may be employed in forming the deposited portions of the sensing element shown in FIGURES 1 and 3.

The typical sensing element 16 shown in FIGURES 1 and 3 may comprise a generally rectangular supporting base 17 of material having very small mass, such as mica, or the like.

A first mask 18 may be employed to deposit the bridge junction terminals, said mask having the respective slots 19, 20, 21 and 22 through which the respective bridge junction terminals 23, 24, 25 and 26 are deposited. The junction terminals may comprise a substantial thickness of a suitable metal, for example, gold.

A second mask 27 may then be employed, said mask 27 being provided with slots 28 and 29 through which are deposited the respective film resistors $R_1$ and $R_3$, the slots being of the correct size to provide the desired nominal resistance values at the correct film thickness for resistors $R_1$ and $R_3$, and being located to respectively connect terminals 25, 24 and 23, 26.

Similarly, a third mask 30 is then employed, said mask 30 having slots 31 and 32 through which the respective resistors $R_2$ and $R_4$ are deposited, connecting the respective terminals 26, 24 and 23, 25, the slots being of the correct size to provide the desired nominal resistance values at the correct film thickness for resistors $R_2$ and $R_4$.

The correct film thicknesses of the resistors $R_1$, $R_3$ and $R_2$, $R_4$ may be determined from known data, such as from respective characteristic curves 33 and 34 showing the variation in resistance with film thickness for the respective resistors formed through the slots 28, 29 and 32, 31. For example, in FIGURE 2, the desired film thickness for the resistors $R_1$, $R_3$ (to provide the desired negative temperature coefficient) will be the value $a$. This will be determined by measuring the resistance of either $R_1$ or $R_3$ as the metal is deposited, and terminating same when the resistance decreases to a value $b$ on curve 33, corresponding to the desired film thickness. The same technique may be employed in depositing the resistors $R_2$ and $R_4$, employing the characteristic curve 34.

The material used to make the resistors may be tungsten, nickel chromium, or any other suitable metal. If so desired, different metals may be used in the same sensing element.

While the deposition technique described above has been that of thermal evaporation, sputtering may also be used. In this process the residual gas pressure is usually between 5 and 50 microns of a residual gas selected to accelerate the sputtering action, such as Argon. A cathode of the desired metal to be deposited is placed opposite the support 17, and a high voltage is applied between the cathode and the support, with the cathode negative. The resulting discharge transfers metal from the cathode to the support at a steady rate.

A device 16 such as described above may be used to advantage to measure residual gas pressure in a vacuum chamber, velocity of gas flow, thermal conductivity in a gas chromatographic analyzer, as a sensing element in temperature-measuring or temperature-responsive equipment, and in numerous other applications.

While a specific embodiment of a temperature-responsive device and a method of fabricating same have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a vacuum gauge, an enclosure adapted to be evacuated, a flat rigid support of insulating material having a relatively small mass, respective deposited metal conductors of substantial thickness on two opposite margins of said support and extending substantial distances along said opposite margins, forming a first pair of Wheatstone bridge terminals, a second pair of deposited metal conductors of substantial thickness on the support located between the first-named pair of conductors and spaced apart by a substantial distance, forming a second pair of Wheatstone bridge terminals, two diagonally opposite film-deposited resistors on said support respectively connecting one of said second pair of terminals to one of said first pair of terminals and the other of said second pair of terminals to the other of said first pair of terminals, said film-deposited resistors being of a first film thickness to provide a negative coefficient of resistance therefor, two additional film-deposited resistors on said support respectively connecting said one of the second pair of terminals to the other of said first pair of terminals and the other of said second pair of terminals to said one of the first pair of terminals, said last-named film-deposited resistors being of a second film thickness to provide a positive temperature coefficient of resistance substantially equal in magnitude to said negative coefficient, a constant voltage source connected to said first-named pair of deposited metal conductors, and a current-indicating device connected to said second-named pair of deposited metal conductors.

2. In a vacuum gauge, an enclosure adapted to be evacuated, an insulating supporting base in said enclosure and having a relatively small mass, a pair of elongated spaced deposited metal conductors of substantial thickness on said base and extending substantial distances opposite each other, forming a first pair of Wheatstone bridge terminals, a second pair of deposited metal conductors of substantial thickness on said base located between the first-named pair of conductors and spaced apart by a substantial distance, forming a second pair of Wheatstone bridge terminals, two diagonally opposite film-deposited resistors on said base respectively connecting one of said second pair of terminals to one of said first pair of terminals and the other of said second pair of terminals to the other of said first pair of terminals, said film-deposited resistors being of a first film thickness to provide a negative coefficient of resistance therefor, two additional film-deposited resistors on said base respectively connecting said one of the second pair of terminals to the other of said first pair of terminals and the other of said second pair of terminals to said one of the first pair of terminals, said last-named film-deposited resistors being of a second film thickness to provide a positive temperature coefficient of resistance substantially equal in magnitude to said negative coefficient, a voltage source connected to one pair of said deposited metal conductors, and a current-indicating device connected to the other pair of said deposited metal conductors.

3. The gauge recited in claim 2, and wherein said supporting base comprises a body of mica.

4. The gauge recited in claim 2, and wherein said deposited metal conductors comprise deposited masses of gold.

(References on following page)

References Cited by the Examiner

UNITED STATES PATENTS

| | | | |
|---|---|---|---|
| 1,448,540 | 3/23 | Hauskeeper | 73—399 |
| 2,589,983 | 3/52 | Blodgett et al. | 338—309 |
| 2,621,276 | 12/52 | Howland | 338—2 |
| 2,736,200 | 2/56 | Kleimack et al. | 73—399 |
| 2,849,583 | 8/58 | Pritkin | 338—309 |
| 2,878,357 | 3/59 | Thomson et al. | 338—309 |

OTHER REFERENCES

Thun, Caudle, and Pasciutti: Rugged Film Resistor Thermometer for Measurement of Surface Temperatures, in the Review of Scientific Instruments, vol. 31, No. 4, April 1960, pages 446–449.

Stout: Basic Electrical Measurements 9 (Prentice Hall, 1960, pages 143–148, New Jersey).

Holland: Vacuum Deposition of Thin Films (John Wiley & Sons, New York) 1956, pages 242–3.

ISAAC LISANN, *Primary Examiner.*